May 8, 1951 J. F. CRONIN 2,551,876
PAPER CUTTER
Filed April 2, 1946
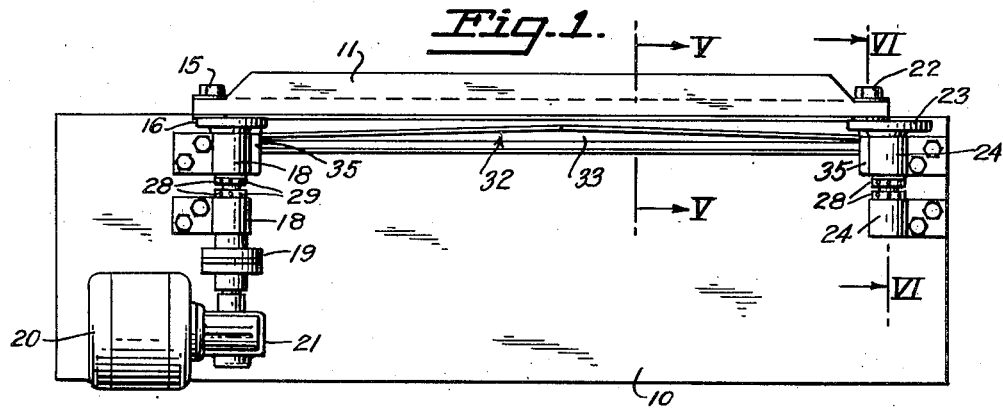
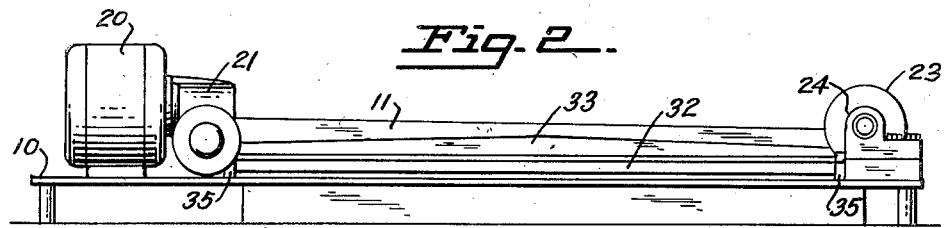
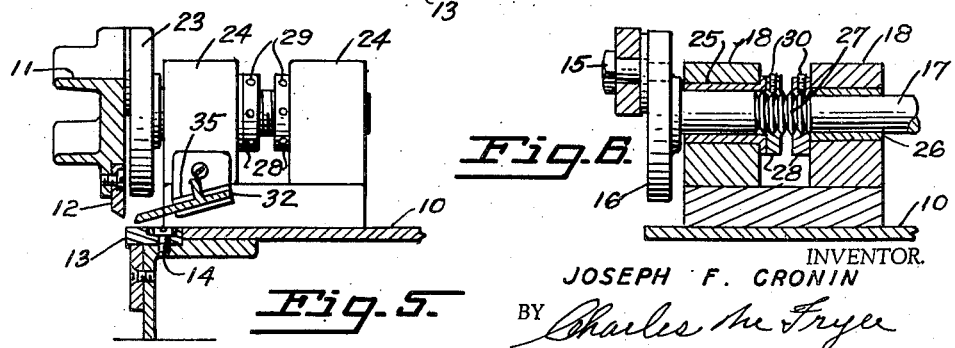
INVENTOR.
JOSEPH F. CRONIN
BY Charles M. Fryer
ATTORNEY Patented May 8, 1951

2,551,876

UNITED STATES PATENT OFFICE 2,551,876

PAPER CUTTER

Joseph F. Cronin, San Francisco, Calif.

Application April 2, 1946, Serial No. 658,910

4 Claims. (Cl. 164—53)

The present invention relates to paper cutters and particularly to a power driven paper cutter of the kind employed for cutting or trimming the edges of blueprints, photographs and other similar sheets of paper.

There are many disadvantages to power driven paper cutters, among which are the danger to the hands of the operator and the difficulty of feeding paper under a shearing blade which is constantly moving with respect to the edge of the table upon which the paper is supported while it is being cut. Another disadvantage resides in the fact that a blade which is pivoted at one end and raised and lowered at its opposite end in the manner of conventional hand operated cutters must move through too great an arc for a practical motor driven operation.

It is an object of the present invention to provide a power driven paper cutter which overcomes the above and other disadvantages and which includes a table and a blade constantly moving with relation thereto and capable of being raised entirely above the level of the table at least once for each cycle of its operation. A further object of the invention is the provision of means to facilitate the insertion of paper to be cut beneath the blade with perfect safety to the operator. Still further and more specific objects and advantages of the invention are made apparent in the following specification wherein reference is made to the accompanying drawings illustrating a preferred form of the invention.

In the drawings:

Fig. 1 is a plan view of a paper cutter embodying the present invention;

Fig. 2 is a front elevation of the paper cutter illustrated in Fig. 1;

Fig. 3 is a rear elevation of the same paper cutter illustrating the movable blade in its lowermost position;

Fig. 4 is a rear elevation of the paper cutter showing the movable blade in its raised position;

Fig. 5 is an enlarged sectional view taken on the line V—V of Fig. 1; and

Fig. 6 is a similar section taken on the line VI—VI of Fig. 1.

Referring first to Figs. 1 and 2 of the drawings, a work support or table is illustrated at 10 and a cutting blade supporting bar 11 is shown as positioned adjacent one edge of the table 10 for cooperation therewith to shear a sheet of paper placed upon the table 10 and overlying said edge. As illustrated in Fig. 4, the cutting blade supporting bar 11 is made up of a U-shaped casting to resist any tendency to flex during the cutting operation and carries a hardened cutting blade 12 which upon raising and lowering of the bar 11 cooperates with a hardened edge member 13 on the table 10. The edge member 13 is preferably adjustably secured to the table as by screws illustrated at 14.

One end of the cutting blade supporting bar 11 is connected as by a crank pin illustrated at 15 with a crank disc 16. The crank disc 16 is carried on a shaft 17 supported in a pair of spaced bearing blocks 18 and connected through a flexible coupling 19 with a motor 20 through a conventional reduction gearing indicated at 21 in Fig. 1. The conventional circuit and switch for energizing the motor 20 are not here illustrated but it is contemplated that either a hand or foot actuated switch may be employed for closing the circuit which energizes the motor 20.

The opposite end of the cutting blade supporting bar 11 is carried on a crank pin 22 of a crank disc 23, the supporting shaft of which is rotatable in a pair of spaced bearing blocks 24. The crank disc 23 is larger than the crank disc 16 and the crank pin 22 thereof is spaced a greater distance from the center of the disc than is the crank pin 15 on the disc 16 which is driven by the motor 20. Consequently, as the crank disc 16 rotates, the crank disc 23 merely oscillates and therefore never reaches a position of dead center which would prevent operation of the cutting blade upon energization of the motor 20. For example, as illustrated in Fig. 4 of the drawings, the crank pins 15 and 22 have each attained an extreme right hand position as viewed in this figure and while the crank pin 15 occupies a position of its complete rotary cycle the crank pin 22 has attained its extreme right hand position and will swing back beyond the center of the crank disc 23 to a similar left hand position. In the position shown in Fig. 4, the full length of the cutting blade 12 is disposed above the top surface of the work support or table 10 so that the entire blade is effective for cutting purposes as it descends and in the position shown a sheet of paper of any length not exceeding that of the blade may be placed beneath the blade and cut thereby.

Because of the fact that the entire length of the cutting blade 12 is raised above the edge of the table with which it cooperates, there is some danger that as the blade descends it will strike the edge of the table instead of registering therewith in perfect shearing contact. It is, therefore, necessary that an exact adjustment of the blade 12 be obtainable for the purpose of insuring perfect shearing contact and this is accomplished by means for accurately adjusting the longitudinal position of the shafts which support the crank discs 16 and 23 by means of which the blade is raised and lowered. Such adjusting means are illustrated in Fig. 6 of the drawings wherein the crank disc 16 is shown as supported on the shaft 17 which passes through a pair of spaced bearing blocks 18 as hereinabove described. Bearing bushings 25 and 26 which are representative of any conventional type of antifriction bearing members are carried by the blocks 18 and the shaft 17 is provided with a threaded portion 27 intermediate its ends and at the portion of its length which spans the space between the bearing blocks 18. Thrust members in the form of nuts 28 are carried by the threaded portion 27 of the shaft 17 to bear against the bearing blocks and to prevent longitudinal movement of the shaft with relation to the bearing blocks. Each of the thrust members 28 is provided with spaced holes 29 in its periphery for the reception of a spanner wrench or the like by means of which it may be rotated and it is also provided with a set screw as indicated at 30 in Fig. 6 for fixing it in its adjusted position. Thus by rotation of the nuts 28, the shaft may be adjusted longitudinally of the bearing blocks 18 until the cutting edge 12 comes into perfect shearing alignment with the hardened edge of the table 19 and by contact with the opposed faces of the bearing blocks 18 the shaft may be positively held in such adjusted position. An arrangement identical with that illustrated in Fig. 6 is also employed in connection with the bearing blocks 24 which support the crank disc 23 at the opposite end of the cutting blade supporting bar 11.

A safety guard and paper guiding member is also provided to protect the hands of the operator and to facilitate feeding of the paper beneath the edge of the cutting member 12 when it is in its raised position. This guard is shown as comprising a transparent plate 32 preferably formed of plastic material and also preferably having a reenforcing rib 33 disposed at right angles to its major plane throughout its length. This plate 32 is supported slightly above and at an angle to the paper supporting surface of the table 10 and inclines downwardly over said table toward the cutting blade 12. At its lowermost edge the plate 32 is very close to the top of the table 10 and also closely approaches the blade 12 so that paper advanced toward the blade 12 is held in close proximity to the table top and may readily be fed beneath the blade as it is in the raised position shown in Fig. 4. The guard plate 32 is also sufficiently close to the table top to prevent the operator's fingers from entering beneath the blade 12 when it is in its raised position and therefore positively insures safety of operation. The guard plate 32 may be supported in any suitable manner and is herein illustrated as engaged at its opposite ends by a pair of brackets 35, one of which is shown in Fig. 6 as secured to the side of one of the bearing blocks 24, the other one of which is similarly secured as indicated in Fig. 1 to the side of one of the bearing blocks 18.

In operation of the device as herein disclosed, the motor is energized to impart a continuous rotary motion to the crank disc 16 and thus to cause intermittent raising and lowering of the cutting edge 12 with relation to the edge 13 of the table 10. A sheet of paper to be cut or trimmed is advanced over the top of the table 10 under the guard plate 32 which, because it is transparent, does not interfere with the operator's vision as he aligns the paper to be cut by the shearing edge 12. The operator's hands are adequately protected and he has only to concern himself with the alignment of the paper under the continuously operating shearing edge and may therefore trim the edges of a sheet of paper quickly, efficiently and safely.

I claim:

1. A paper cutter comprising a work supporting surface, a blade cooperating with an edge of said surface, a rotatable crank disc having a crank pin supporting one end of said blade, an oscillating crank disc having a crank pin supporting the opposite end of said blade, said crank pins being arranged to raise the full length of the blade above the work supporting surface, and means for driving the rotating crank disc and means for adjusting the crank discs to insure perfect shearing contact between the blade and the edge of the work supporting surface.

2. A paper cutter comprising a work supporting surface, a blade mounted for shearing action against one edge of said surface, crank discs supporting opposite ends of said blade, shafts carrying said crank discs, a pair of spaced bearings for each of said shafts, and adjustable thrust members carried by the shafts and interposed between the bearings.

3. A paper cutter comprising a work supporting surface, a blade having an elongated cutting edge supported for shearing action relative to an edge of said surface, a rotatable driven crank disc supporting the blade adjacent one end of its cutting edge and an oscillating crank disc supporting the blade adjacent the opposite end of its cutting edge.

4. A paper cutter comprising a work supporting surface, a blade having an elongated cutting edge supported for shearing action relative to an edge of said surface, a rotatable driving crank associated with the blade adjacent one end of its cutting edge and a longer crank supporting the blade adjacent the opposite end of its cutting edge whereby upon rotation of the driving crank the longer crank will oscillate and the blade will be raised and lowered relative to the work surface throughout its full length and with an angular shearing motion.

JOSEPH F. CRONIN.

REFERENCES CITED

The following references are of record in the file of this patent:

UNITED STATES PATENTS

| Number | Name | Date |
| --- | --- | --- |
| 286,373 | Baumann | Oct. 9, 1883 |
| 395,275 | Hyde | Dec. 25, 1888 |
| 700,419 | Hammond | May 20, 1902 |
| 895,634 | Hathaway | Aug. 11, 1908 |
| 1,009,028 | Brown et al. | Nov. 14, 1911 |
| 1,433,799 | Caywood | Oct. 31, 1922 |
| 1,634,275 | Smithmans | July 5, 1927 |
| 2,130,818 | Soderberg | Sept. 20, 1938 |
| 2,139,298 | Brand | Dec. 6, 1938 |